US006973965B2

(12) United States Patent
Meshenky

(10) Patent No.: US 6,973,965 B2
(45) Date of Patent: Dec. 13, 2005

(54) HEAT-EXCHANGER ASSEMBLY WITH WEDGE-SHAPED TUBES WITH BALANCED COOLANT FLOW

(75) Inventor: Steven P. Meshenky, Racine, WI (US)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 10/316,350

(22) Filed: Dec. 11, 2002

(65) Prior Publication Data

US 2004/0112576 A1    Jun. 17, 2004

(51) Int. Cl.[7] ............... F24B 1/06; F28D 7/06; F28F 1/00
(52) U.S. Cl. ............ 165/125; 165/176; 165/177
(58) Field of Search ............... 165/146, 147, 165/125, 177, 183, 166, 176

(56) References Cited

U.S. PATENT DOCUMENTS

| | | | |
|---|---|---|---|
| 1,657,202 A | | 1/1928 | Ellyson |
| 2,271,648 A | | 2/1942 | Kleist |
| 2,650,073 A | | 8/1953 | Holm |
| 3,175,962 A | * | 3/1965 | Holtslag ............... 165/147 |
| 3,860,065 A | | 1/1975 | Schauls |
| 4,438,809 A | * | 3/1984 | Papis ............... 165/166 |
| 5,078,206 A | * | 1/1992 | Goetz, Jr. ............... 165/125 |
| 5,139,083 A | | 8/1992 | Larinoff |
| 6,138,746 A | | 10/2000 | Livolsi et al. |
| 6,161,616 A | * | 12/2000 | Haussmann ............... 165/176 |
| 6,173,759 B1 | | 1/2001 | Galyon et al. |
| 6,340,055 B1 | | 1/2002 | Yamauchi et al. |
| 6,546,998 B2 | | 4/2003 | Oh et al. |

FOREIGN PATENT DOCUMENTS

| | | | | |
|---|---|---|---|---|
| DE | 154851 | * | 7/1938 | ............... 165/146 |
| JP | 62-166294 | * | 7/1987 | ............... 165/146 |

* cited by examiner

Primary Examiner—Ljiljana Ciric
(74) Attorney, Agent, or Firm—Wood, Phillips, Katz, Clark & Mortimer

(57) ABSTRACT

A heat-exchanger assembly, which can be advantageously employed as an intercooler for an air-charging system for an internal combustion engines includes a plurality of generally wedge-shaped coolant tubes through which coolant is directed for effecting cooling of compressed air flowing about the tubes. In order to promote efficient operation, each of the wedge-shaped cooling tubes includes a plurality of coolant passages of substantially identical hydraulic diameter or cross-sectional area, thereby promoting uniform flow of coolant through each coolant tube. Each coolant tube includes outer walls which may be of a substantially uniform thickness, or which may increase in thickness across the width of the tube.

6 Claims, 2 Drawing Sheets

HEAT-EXCHANGER ASSEMBLY WITH WEDGE-SHAPED TUBES WITH BALANCED COOLANT FLOW

TECHNICAL FIELD

The present invention relates generally to heat exchangers, and in more particular applications, to radial heat-exchangers such as a heat-exchanger used as an intercooler in a combustion air charging system such as a turbocharger or supercharger for engines, and more particularly to a heat-exchanger assembly having wedge-shaped coolant tubes which include internal coolant passages having substantially identical hydraulic diameters or cross-sections for balancing coolant flow and optimizing heat exchange.

BACKGROUND OF THE INVENTION

Heat-exchanger assemblies are employed in a wide variety of applications, with one application being use as an intercooler for turbo-charged or super-charged internal combustion engines. In the case of a turbocharger, at least one rotary compressor wheel is driven by the exhaust gas of the engine, while in the case of a supercharger, at least one rotary compressor wheel is driven mechanically, usually by the rotary output of the engine. In either case, the compressor wheel is employed to compress and elevate the pressure of ambient air prior to induction into the engine to support combustion. By compression of the intake air, a given volume of air will have a greater mole content of oxygen than an otherwise equal volume of air at ambient pressure. As a consequence, the additional oxygen permits the combustion of a greater quantity of fuel so that for an engine of a given size, a greater power output can be achieved as a result of the charging of the combustion air.

The efficiency of such air-charging systems can be improved through use of a heat-exchanging arrangement, typically referred to as an intercooling system. Because the ambient air is heated as it is compressed, part of the efficiency derived by employing the combustion air-charging device in the first instance, i.e., the densification of the combustion air supplied to the engine, is lost because a volume of hot, compressed air contains less oxygen than an equal volume of cooler, compressed air, when both are at the same pressure. Thus, for a given pressure, a cooler combustion air charge for an engine permits more power to be developed, compared to the same charge at the same pressure at a higher temperature.

To thus maximize the efficiency of such air-charging systems, intercoolers are employed to cool the compressed air prior to its induction into the engine so as to provide, at any given pressure, a maximum mole content of oxygen.

While heat-exchanging intercoolers for internal combustion engines can be of a generally rectangular-shaped configuration, systems which are desirably compact are generally torodial or doughnut-shaped, and can be fitted about the rotary shaft of the associated air-charging compressor. For such an arrangement, heat-exchanging characteristics of the intercooler are optimized by employing coolant tubes which have a generally wedge-shaped cross-sectional configuration. Such wedge-shaped tubes can be arranged generally parallel to the associated rotating shaft, with flow of air to be cooled passing either radially inwardly or radially outwardly through the torodial intercooler. Examples of such arrangements are disclosed in commonly-assigned, co-pending U.S. patent application Ser. No. 10/251,537, filed Sep. 20, 2002, entitled Internally Mounted Radial Flow Intercooler for a Combustion Air Charger, naming Steven P. Meshenky et al. as inventors, the disclosure of which is hereby incorporated by reference.

In the typical wedge-shaped coolant tube of this type of heat-exchanging intercooler, the minor dimension of the tube increases in a direction along the tube depth or width. If a uniform wall thickness is employed for the wedge-shaped tube, the increased tube minor dimension increases the flow area, resulting in reduced heat-transfer performance.

The present invention contemplates a heat-exchanger assembly having wedge-shaped coolant tubes which are configured to optimize heat-exchanging performance.

SUMMARY OF THE INVENTION

A heat-exchanger assembly embodying the principles of the present invention can be advantageously employed as an intercooler for use with an internal combustion engine air-charging system, and can find other applications where the typically torodial configuration of the heat-exchanger assembly can be advantageously employed. For optimizing the heat-exchanging characteristics of the torodial heat-exchanger assembly, the illustrated assembly includes a plurality of generally wedge-shaped coolant tubes. In order to offset the performance loss which would otherwise be associated with the increasing tube minor dimension of a wedge-shaped coolant tube, the coolant tubes in a heat-exchanger assembly embodying the principles of the present invention act to balance and maintain flow uniformity across the depth or width of the tube. This is accomplished by keeping the hydraulic diameter, or the flow area, constant across the tube width. Optimized heat-exchanging performance is thus obtained.

In accordance with the illustrated embodiment, a heat-exchanger assembly embodying the principles of the present invention includes first and second manifolds, and a plurality of tubes extending between the first and second manifolds to define a first fluid pass through the heat-exchanger. The manifolds are joined to associated coolant jacketing whereby fluid, which may be a coolant, such as water, is directed through the tubes.

Each of the tubes has a generally wedge-shaped, cross-sectional configuration which tapers outwardly in a direction along an axis extending along the width or depth of each of the tubes. Each of the tubes defines a plurality of fluid flow passages extending along the length of the tube for carrying fluid therethrough in parallel-flow relationship, that is, with the fluid flowing in the first pass through the passages of any one tube flowing in the same direction.

In accordance with the present invention, the plurality of fluid passages of each tube are configured to promote uniform flow of fluid through the tubes. It is contemplated that uniformity of flow can be achieved by providing the passages with substantially identical hydraulic diameters, or with substantially identical cross-sectional areas. In accordance with one form of the present invention, each of the tubes includes a pair of opposite walls which define expansive, heat-exchanging surfaces of the tube. Uniformity of flow is promoted by having the thickness of each wall increase in a direction along the axis of each tube. In this illustrated embodiment, each of the passages of each tube has a generally rectangular cross-section, with the cross-sections being of substantially equal area.

In an alternate embodiment, the opposite walls of each tube are of substantially uniform thickness. In this embodiment, the passages, having substantially identical hydraulic diameters, are illustrated as having a generally hourglass-shaped, cross-sectional configurations, but it will be understood by those skilled in the art that the fluid passages may be otherwise shaped. Again, uniformity of fluid flow is promoted by the substantially identical hydraulic diameters, even though the opposite walls of the tube are of substantially uniform thickness.

The heat-exchanger assembly having wedge-shaped tubes in accordance with the present invention may include tubes of an extruded construction, or may be of a fabricated construction, including at least one outer wall, and a plurality of inserts joined to the outer wall to define the fluid passages of the tube. In accordance with the preferred embodiment, a plurality of fins are positioned between adjacent ones of the tubes in the heat-exchanger assembly, with the illustrated construction including fins having a serpentine configuration.

Other features and advantages of the present invention will become readily apparent from the following detailed description, the accompanying drawings, and the appended claims.

DETAILED DESCRIPTION

Figure 1:
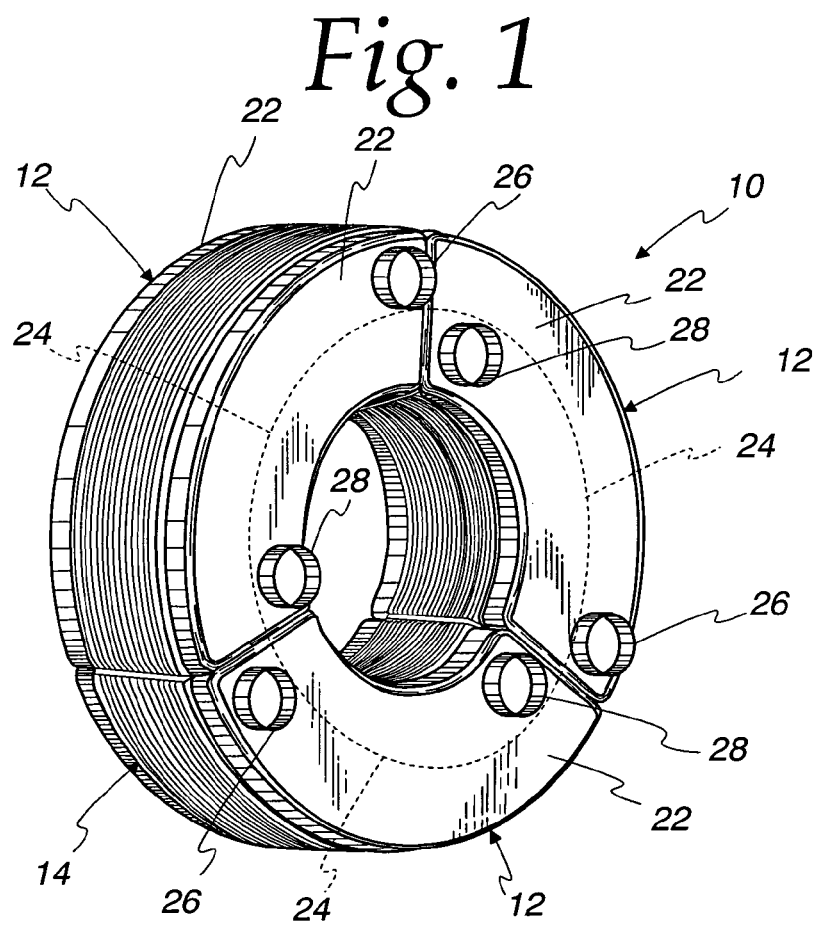
FIG. 1 is a perspective view of a typical heat-exchanger assembly that can be configured in accordance with the principles of the present invention.

While the present invention is susceptible of embodiment in various forms, there is shown in the drawings, and will hereinafter be described, presently preferred embodiments, with the understanding that the present disclosure is to be considered as an exemplification of the invention, and is not intended to limit the invention to the specific embodiment illustrated.

With reference now to FIG. 1, therein is illustrated a typical heat-exchanger assembly 10 that can be configured in accordance with the present invention. While the present invention will be described in a form suitable for use as an intercooler with a liquid coolant, it is to be understood that a heat-exchanger assembly embodying the principles disclosed herein can be otherwise configured, including arrangements wherein a fluid other than a liquid is employed for flow through the tubes of the assembly, and in which a fluid to be cooled is directed through the tubes for the rejection of heat to a fluid flowing around the tubes.

Heat-exchanger assembly 10 has a generally torodial or doughnut-shaped configuration, and as such, is particularly suited for use as an intercooler for an air-charging system of an internal combustion engine, such as a turbocharger or supercharger. In such an arrangement, the heat-exchanger assembly 10 can fit about the rotatably-driven shaft of the associated air-charging device, thus providing a desirably compact configuration for the air-charging system. In such an arrangement, compressed air from the associated air-charging system flows generally radially of the torodial heat-exchanger assembly, acting to cool the air compressed by air-charging system for enhancing efficiency of the associated internal combustion engine.

As will be further described, the heat-exchanger assembly 10 includes a plurality of generally wedge-shaped tubes through which coolant or another fluid flows for cooling air, or another gas, passing through the assembly. While a heat-exchanger assembly embodying the principles of the present invention is particularly suited for use as an intercooler for an air-charging system of an internal combustion engine, it will be recognized by those skilled in the art that a heat-exchange assembly employing wedge-shaped coolant tubes configured in accordance with the present invention can be suitably employed for other applications where a heat-exchanger having this type of configuration can be advantageously employed.

It will be understood that the heat-exchanger assembly 10 is of an exemplary construction, including a plurality of independent segments 12 (three being illustrated), with this arrangement having a central opening which can be configured to have a smaller radius than the radius of a compressor wheel of the associated air-charging device. By this arrangement, the heat-exchanger assembly can be removed, segment by segment, for servicing. However, it will be appreciated that this type of torodial or doughnut-shaped heat-exchanger may be of a non-segmented, unitary annular configuration for those application where the central opening of the heat-exchanger has a radius which is larger than the radius of the associated compressor wheel.

In an exemplary application, the doughnut-shaped heat-exchanger assembly is positioned concentrically about the rotary shaft of the associated compressor wheel, with a air inlet defined by the radially outer periphery of a core 14 of the assembly. The outlet for the cooled air is defined by the radially inner periphery of the core, with gas flow thus being radially, inwardly directed through the heat-exchanger. Coolant flow paths in the core extend generally axially from side-to-side therein, with the coolant thus acting to cool the air as it flows radially inwardly through the heat-exchanger.

Figure 2:
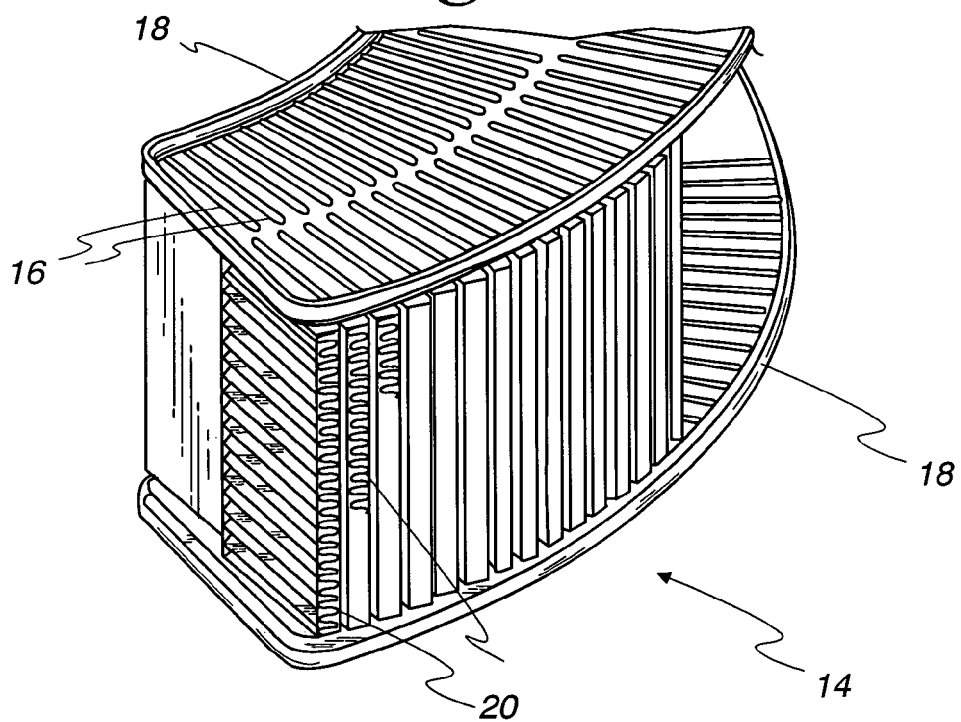
FIG. 2 is a fragmentary, perspective view, partially cut away, illustrating the construction of the present heat-exchange assembly.

As illustrated in FIG. 2, the core 14 of the heat-exchanger assembly 10 includes at least one circular row of spaced coolant tubes 16 which extend between manifolds 18 of one of the core of each of segments 12 of the heat-exchanger assembly 10. In the illustrated embodiment, two circular rows of coolant tubes 16 are illustrated, in radially spaced relationship, with the coolant tubes 16 and the manifolds 18 together forming the core 14 of the heat-exchanger assembly.

Figure 3:
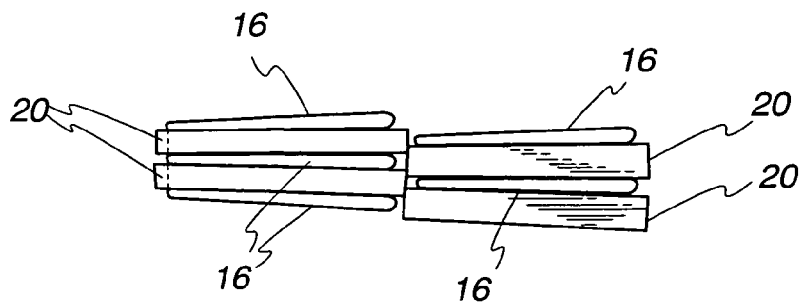
FIG. 3 is a fragmentary, cross-sectional view of the present heat-exchanger assembly.

Enhanced heat-exchanging performance is provided by a plurality of fins which are positioned between adjacent ones of the coolant tubes 16. FIGS. 2 and 3 illustrate the provision of serpentine cooling fins 20 positioned between adjacent ones of the coolant tubes, with air flowing radially through the assembly passing in heat-exchanging relationship with the fins, which are cooled by the coolant passing through the associated coolant tubes 16. As will be recognized by those skilled in the art, cooling fins 20 can be of a plate-like configuration, that is, provided in the form of a series of spaced-apart, generally circular plates, positioned between manifolds 18, with coolant tubes 16 extending through the plate-like cooling fins. FIG. 1 illustrates the present heat-exchanger assembly with such plate-like cooling fins. Such plate-like cooling fins can be of generally segmented configuration like the core segments 12, or may be of a generally ring-shaped, annular configuration for use in forming a non-segmented core.

As illustrated in FIG. 3, if a plurality of circular rolls of coolant tubes 16 are provided, in combination with either serpentine fins or plate fins, it is desirable to arrange the rows of coolant tubes in a staggered relationship to each other, that is, such that a radially inner row of the coolant tubes is aligned with fins of a radially outer row, and vice versa. This desirably acts to create a tortuous path for air flow through the core of the heat-exchanger, thereby enhancing heat transfer.

With reference to FIG. 1, flow of coolant through the core 14 of the heat-exchanger is facilitated by the provision of generally arcuate-shaped headers 22 fitted to manifolds 18 on respective opposite sides of the core of each segment 12 of the heat-exchanger assembly 10. In a torodial heat-exchanger of a non-segmented configuration, it will be appreciated that the headers 22 may be generally annular and ring-shaped, and non-segmented as shown in FIG. 1. Additionally, headers 22 may be of a non-segmented configuration and employed in combination with segmented cores.

In the illustrated configuration, the headers 22 on one side of the core 14 are suitably internally partitioned so as to direct flow into one of the circular rows of coolant tubes 16, and receive flow out of the other circular row of coolant tubes. In particular, one of the headers 22 of each segment includes an internal partition 24, shown in phantom line, with ports 26, 28 respectively provided for directing flow into one of the circular rows of coolant tubes 16, and for receiving flow from the other one of the circular rows of coolant tubes. The header 22 provided on the opposite side of the heat-exchanger assembly illustrated in FIG. 1 may be non-partitioned internally, thus directing flow from one of the rows of coolant tubes into the other row.

In accordance with the present invention, each of the coolant tubes 16 is generally wedge-shaped, and is specifically configured to promote uniformity of coolant flow therethrough. This can be achieved by providing the tubes with substantially identical hydraulic diameters. The hydraulic diameter is calculated by dividing four times the cross-sectional area of a passage by its wetted perimeter. For some applications, the passages can be configured to have substantially identical cross-sectional areas to promote uniformity of heat transfer.

Figure 4:
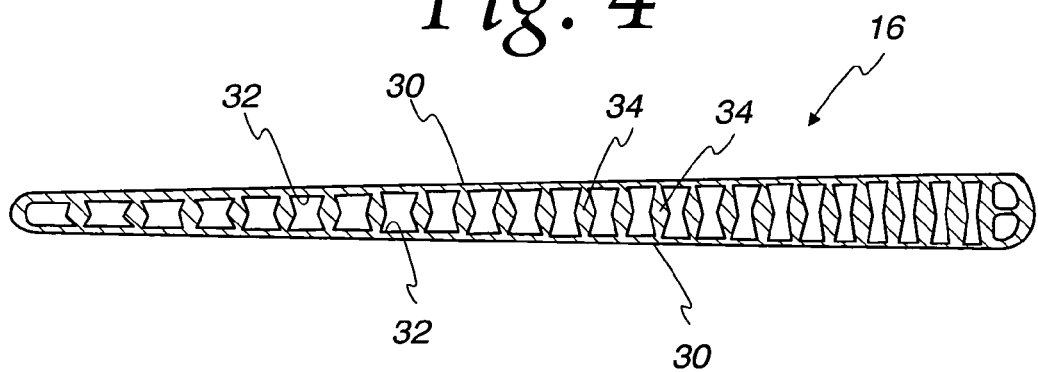
FIG. 4 is a relatively enlarged, cross-sectional view illustrating a tube of the present heat-exchanger assembly embodying the principles of the present invention.

In the embodiment illustrated in FIG. 4, each coolant tube 16 is of a generally wedge-shaped, cross-sectional configuration which tapers outwardly in a direction along an axis extending along the width of the coolant tube, that is, in a direction such that the minor dimension of the tube increases (from left to right, in the orientation illustrated in FIG. 4). In this embodiment, the coolant tube 16 includes opposite walls 30 which define expansive, heat-exchanging surfaces of the tube, wherein each of the walls 30 is of substantially uniform thickness.

In order to promote uniformity of coolant flow across the width of the tube 16, coolant tube 16 defines a plurality of coolant passages 32 having substantially identical hydraulic diameters. As will be observed, the specific configuration of the coolant passages 32 of the tube 16 is selected to be such that the hydraulic diameter of each passage is the same, even though the minor dimension of the tube 16 increases from left to right, referring to the orientation of FIG. 4. Internal partitions 34 extend between opposite walls 30 to define the coolant passages 32, with the illustrated embodiment being such that the partitions 34 provide each of coolant passages 32 with a generally hourglass-shaped cross-sectional configuration.

Coolant tubes 16 can be of a fabricated configuration, including at least one outer wall, and a plurality of inserts 34 connected to the at least one outer wall for defining the internal coolant passages 32. Alternatively, coolant tube 16 may be of an extruded configuration.

Figure 5:
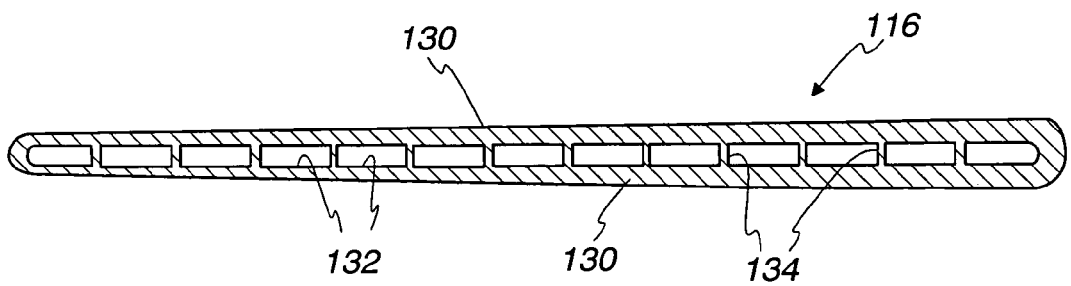
FIG. 5 is an alternate embodiment of a coolant tube for the present heat-exchanger assembly.

An alternate embodiment of the coolant tubes of the present heat-exchanger assembly, designated 116, is illustrated in FIG. 5. In this embodiment, the generally wedge-shaped coolant tube has a pair of opposite walls 130 which each have a thickness that increases in a direction along the axis of the tube which extends along the tube width or depth (left to right, referring to the orientation of FIG. 5). Internal partitions 134 extend between the outer walls 130, to thereby define a plurality of coolant passages 132 having generally uniform cross-sectional areas, with the passages 132 being of a substantially constant hydraulic diameter. In this illustrated embodiment, the coolant passages 132 are each of a generally rectangular cross-sectional configuration.

As in the previous embodiment, coolant tube 116 may be of either a fabricated construction, or of an extruded construction.

Thus, the heat-exchanger assembly configured in accordance with the present invention desirably acts to offset the performance loss typically associated with the increasing tube minor dimension of a wedge-shaped heat-exchanger tube. The coolant tubes of the present invention maintain uniformity of coolant flow therethrough across the width of the tube by balancing the pressure drop across the tube width or depth.

From the foregoing, numerous modifications and variations can be effected without departing from the true spirit and scope of the novel concept of the present invention. It is to be understood that no limitation with respect to the specific embodiments disclosed herein is intended or should be inferred. The disclosure is intended to cover, by the appended claims, all such modifications as fall within the scope of the claims.

What is claimed is:

1. A heat-exchanger assembly comprising:
   first and second manifolds; and
   a plurality of tubes extending between said first and second manifolds to define a first fluid pass through the heat-exchanger,
   each of said tubes have a generally wedge-shaped cross-sectional configuration which tapers outwardly in a direction along an axis extending along the width of each said coolant tubes,
   each said tube defining a plurality of flow passages extending along the length of the tube for carrying fluid through the first pass in parallel-flow relationship,
   said plurality of passages having substantially identical hydraulic diameters to promote uniform distribution of flow across the width of each tube through the first pass;
   wherein each of said tubes includes a pair of opposite walls which define expansive, heat-exchanging surfaces of each tube, each of said walls being of substantially uniform thickness.

2. A heat-exchanger in accordance with claim 1, wherein:
   each of said flow passages has a generally hourglass-shaped cross-section.

3. A heat-exchanger assembly comprising:
   first and second manifolds; and
   a plurality of tubes extending between said first and second manifolds to define a first fluid pass through the heat-exchanger,
   each of said tubes have a generally wedge-shaped cross-sectional configuration which tapers outwardly in a direction along an axis extending along the width of each said coolant tubes, each said tube defining a plurality of flow passages extending along the length of the tube for carrying fluid through the first pass in parallel-flow relationship, said plurality of passages having substantially identical hydraulic diameters to promote uniform distribution of flow across the width of each tube through the first pass;

including a plurality of fins positioned between adjacent ones of said tubes.

4. A heat-exchanger in accordance with claim 3, wherein:
said fins have a serpentine configuration.

5. A heat-exchanger assembly, comprising:

first and second manifolds; and a plurality of tubes extending between said first and second manifolds, said tubes being arranged in first and second rows, in staggered relationship to each other, the first row defining a first pass through the heat-exchanger, the second row defining a second pass through the heat-exchanger, each of said tubes having a generally wedge-shaped, cross-sectional configuration which tapers outwardly in a direction along an axis extending along the width of each tube, each said tube defining a plurality of flow passages extending along the length of the tube for carrying coolant through the corresponding pass in parallel-flow relationship, said plurality of flow passages having substantially identical hydraulic diameters to promote uniform flow of coolant through said corresponding pass, each of said tubes includes a pair of opposite walls which define expansive, heat-exchanging surfaces of each tube, each of said walls being of substantially uniform thickness.

6. A heat-exchanger assembly, comprising:

first and second manifolds; and a plurality of tubes extending between said first and second manifolds, said tubes being arranged in first and second rows, in staggered relationship to each other, the first row defining a first pass through the heat-exchanger, the second row defining a second pass through the heat-exchanger, each of said tubes having a generally wedge-shaped, cross-sectional configuration which tapers outwardly in a direction alone an axis extending alone the width of each tube, each said tube defining a plurality of flow passages extending along the length of the tube for carrying coolant through the corresponding pass in parallel-flow relationship, said plurality of flow passages having substantially identical hydraulic diameters to promote uniform flow of coolant through said corresponding pass, a plurality of fins positioned between adjacent ones of said tubes, said fins positioned between said tubes of one of said rows being generally aligned with said tubes of the other of said rows.

* * * * *